March 26, 1968  A. KAUFMANN  3,374,814
SAWING APPARATUS
Filed Jan. 20, 1966
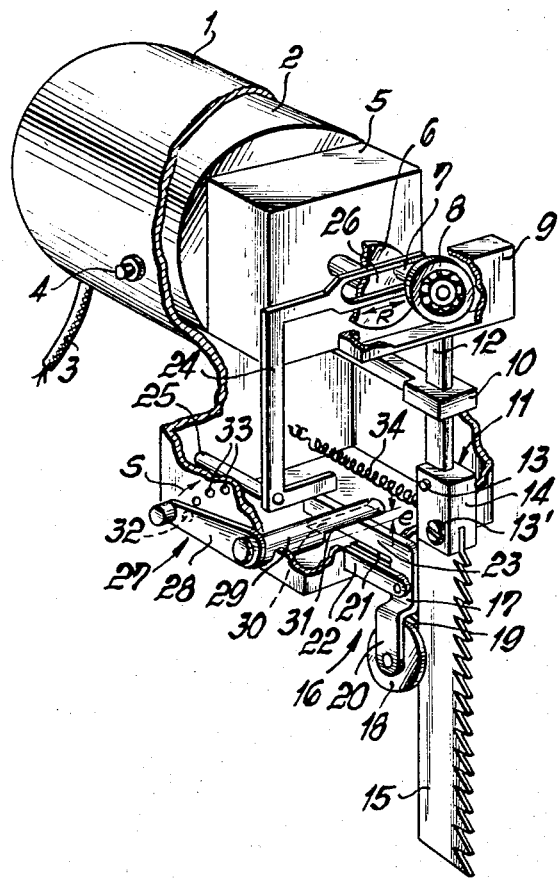
INVENTOR
ALBERT KAUFMANN
by Michael J. Striker
ATTY

United States Patent Office 3,374,814
Patented Mar. 26, 1968

3,374,814
SAWING APPARATUS
Albert Kaufmann, Zuchwil, Soleure, Switzerland, assignor to Scintilla A.G., Solothurn, Switzerland
Filed Jan. 20, 1966, Ser. No. 521,887
Claims priority, application Germany, Jan. 21, 1965, S 95,091
15 Claims. (Cl. 143—68)

ABSTRACT OF THE DISCLOSURE

A sawing apparatus in which feeding means engage an elongated saw blade reciprocatable in longitudinal direction to impart to the saw blade during its reciprocation a feeding movement transverse to the direction of its reciprocation and in which operator controlled adjusting means cooperate with the feeding means for regulating the movement of the blade in the feeding direction between zero and a prdetermined maximum.

The present invention relates to a sawing apparatus in which drive means, connected to the saw blade to reciprocate the latter in longitudinal direction, drive also means engaging the rear edge of the saw so as to impart to the saw blade during its reciprocation in longitudinal direction an additional movement in feeding direction in which the teeth of the blade are pressed against a workpiece.

Experience has shown that the action of a motor driven saber saw may be greatly increased by imparting to the saw blade in addition to the reciprocating movement in longitudinal direction thereof an additional movement, likewise derived from the motor of the apparatus, in feeding direction transverse to the longitudinal movement, in which the teeth of the saw blade are pressed against the workpiece.

Such an additional movement in feeding direction imparted to the blade from the drive motor is especially advantageous during sawing of relatively thick workpieces, however, during sawing of relatively thin workpieces, for instance, thin plywood plates, this additional movement in feeding direction imparted to the saw blade by the drive means of the apparatus results in a rough cut and splintering of the plate along the cut.

To overcome this disadvantage a saber saw is already known in which a lever is pivotally mounted on the housing of the sawing apparatus, which carries on the free end thereof a roller engaging the rear edge of the saw blade and which carries in addition thereto an adjustment screw which engages with the free end thereof one end of a bolt, which in turn engages with its other end the periphery of an eccentric shaft driven by the motor of the sawing apparatus, so that during reciprocating movement of the saw blade in longitudinal direction, the bolt will be pressed by the eccentric shaft against the adjustment screw, whereby the roller and the saw blade is moved in feeding direction. Whenever this sawing apparatus is to be used on a relatively thin workpiece, which would be deterimentally affected by the additional movement of the saw blade in feeding direction, the adjustment screw is loosened and the bolt removed so that the lever and the roll thereon will not carry out any movement and so that the saw blade will only be reciprocated in longitudinal direction. This known construction, however, has not worked out satisfactorily in practice, since the mounting, respectively removal, of the bolt is cumbersome and time consuming and can be carried out only during standstill of the apparatus. In addition, the stroke of the feeding movement can only be very unsatisfactorily adjusted with this known arrangement and, since any adjustment can be carried out only during standstill of the apparatus, it is impossible to properly adjust this apparatus for optimum action during sawing of workpieces which vary in thickness.

It is an object of the present invention to provide for a sawing apparatus of the aforementioned kind in which a movement in feeding direction, in addition to the reciprocating movement in longitudinal direction, may be imparted to the saw blade by means of the drive motor of the apparatus, and which avoids the disadvantage of sawing apparatus of this kind known in the art.

It is an additional object of the present invention to provide for a sawing apparatus of the aforementioned kind in which the stroke imparted to the saw blade in feeding direction may be varied during operation of the saw blade between zero and a maximum.

It is a further object of the present invention to provide for a sawing apparatus of the aforementioned kind which is composed of relatively few and simple parts so that the apparatus can be manufactured at reasonable cost and will stand up trouble-free under extended use.

With these objects in view, the sawing apparatus according to the present invention mainly comprises support means, an elongated saw blade mounted on the support means for reciprocating movement in longitudinal direction, drive means operatively connected to the saw blade for reciprocating the latter in said direction, feeding means operatively connected to the drive means and engaging the saw blade for imparting to the latter during reciprocation in longitudinal direction a movement having a component in feeding direction of the blade in which the teeth of the blade are pressed against the workpiece, and operator controlled adjustment means cooperating with the feeding means for regulating the movement of the blade in the feeding direction imparted thereto by the feeding means between zero and a predetermined maximum.

The feeding means preferably include a drive member operatively connected to the drive means to be reciprocated thereby with a stroke of given amplitude, and lever means engaging with one end the saw blade and connected to the support means for tilting movement about a pivot axis in such a manner that the other end of the drive member is adapted to engage during each stroke the lever means at a portion thereof spaced from the pivot axis. The adjustment means engages thereby the lever means spaced from its pivot axis for limiting engagement between the lever means and the drive member to a selected part of the stroke of the latter.

Preferably the lever means comprises a lever member pivotally connected intermediate its ends to the support means and a roller carried at one end of the lever member and engaging the saw blade and in this arrangement the drive member is adapted to engage the lever member in the region of the other end thereof.

According to a further feature of the present invention a spring cooperates with the saw blade for pressing the rear edge thereof against the peripheral surface of the roller.

The novel features which are considered as characteristic for the invention are set forth in particular in the appended claims. The invention itself, however, both as to its construction and its method of operation, together with additional objects and advantages thereof. will be best understood from the following description of specific embodiments when read in connection with the accompanying drawings, in which the figure is a partially sectioned perspective view of the sawing apparatus according to the present invention.

Referring now to the drawing, it will be seen that the sawing apparatus of the present invention comprises support means in form of a housing 1 in which an electromotor 2 is mounted, which may be connected by means of conductors 3 to a source of current supply, and which can be switched on and off by a switch 4. The motor 2 is connected by means of a reduction gearing 5, not shown in detail in the drawing, to eccentric means including a disc 6 fixed to the drive shaft of the reduction gearing 5 and a pin 7 fixed at one end to the disc 6 and extending parallel to the drive shaft laterally spaced therefrom. The inner race ring of a ball bearing 8 is fixedly connected to the other end of the pin 7. A casing 9, open at the side thereof facing the gearing 5, engages with parallel inner surfaces of its top and bottom wall diametrically opposite portions of the outer peripheral surface of the ball bearing 8, so that during rotation of the disc 6 about its axis, the ball bearing 8 will roll along the inner surfaces of the top and bottom wall of the casing 9 to impart thereby to the latter and to the saw blade holder 11, integral with the casing 9 and slidably guided in a guide 10 fixed to the housing 1, an oscillating movement which is normal to the rolling direction R of the ball bearing 8. The tool holder 11 includes a guide rail 12, which is guided in the guide member 10 for reciprocating movement in longitudinal direction, and a member 14, pivotally connected by means of a pivot pin 13 to the lower end of the guide rail, to which the upper end of the saw blade is connected, for instance by a screw 13'.

During operation of the drive means constituted by the motor 2, the gearing 5, and the eccentric means 6, 7, the saw blade 15 connected by connecting means constituted by the ball bearing 8, the casing 9, the guide rail 12 and the member 13, is reciprocated in longitudinal direction thereof.

The sawing apparatus according to the present invention further comprises feeding means 16, 24 operatively connected to the drive means and engaging the saw blade 15 for imparting to the latter during reciprocation in longitudinal direction a movement having a component in feeding direction of the blade in which the teeth of the blade are pressed against a workpiece. The feeding means preferably include a drive member 24 operatively connected at one end thereof to the drive means to be reciprocated with a stroke of given amplitude, and lever means 16 engaging with one end the saw blade and connected to the support means for tilting movement about a pivot axis in such a manner that the other end of the drive member 24 is adapted to engage during each stroke the lever means 16 at a portion thereof spaced from the pivot axis to press thereby the one end of the lever means 16 against the rear edge of the saw blade 15. The drive member 24 may have, as shown in the drawing, the form of an angle lever in which an upper arm extending transverse to the eccentric pin 7 is formed with an elongated slot 26 through which the pin 7 slidingly extends. The angular lever 24 forming the drive member has a lower arm extending parallel to the upper arm and the lever 24 is pivotally connected in the region of the left end, as viewed in the drawing, of the lower arm to a pivot pin 25 fixed at the rear end thereof to a wall portion of the housing 1. During rotation of the eccentric means 6, 7, the free end of the lower arm of the lever member 24 will therefore perform a reciprocating stroke of a given amplitude. The lever means 16 preferably comprise a lever 17 which is likewise formed as an angle lever which has one arm 20 extending substantially parallel to the rear edge of the saw blade 15 and carrying at the free lower end thereof a roller 18. The lever 17 is pivotally connected to the housing by means of a pair of straps 21 and 22 projecting forwardly from the front wall of the housing 1. The other arm 23 of the angle lever 17 extends substantially normal to the arm 20 into the housing, with the bottom face of the arm 23 spaced from the upper surface of the bottom wall of the housing. The lower arm of the drive member 24 engages in the region of the free end thereof the inwardly extending arm 23 of the lever 17 in the region of the free rear end thereof so as to impart during reciprocating or oscillating movement if the lower arm of the drive member 24 an oscillating movement to the lever means 17 and to impart thereby to the saw blade a movement in feeding direction, that is a movement in which the teeth of the saw blade 15 are pressed against a workpiece.

The sawing apparatus according to the present invention includes further operator controlled adjustment means 27 cooperating with the feeding means 16, 24 for regulating the movement of the blade in feeding direction imparting thereto by the feeding means between zero and a predetermined maximum. The adjustment means 27 preferably includes an abutment member 29 in form of a cylindrical rod extending transverse to the arm 23 of the angle lever 17 and being mounted in a side wall of the housing 1 for pivotal movement about its axis, and an arm member 28 fixed to the rod 29 at the end thereof projecting beyond the housing 1 for turning the rod 29 about its axis between a plurality of adjusted positions. The rod 29 is provided at a portion thereof extending over the arm 23 of the lever 17 with a cutout so as to form on the rod 29 a flat bottom face 30 extending parallel to the rod axis and the bottom face 30, when parallel to the top face of the arm 23, is spaced from the latter a distance e. During turning of the arm 28 in direction of the arrow S, the rod 29 will be turned about its axis in clockwise direction so that the front edge 31 of the bottom face 30 of the rod 29 will engage the top face of the arm 23 so as to turn the latter in counterclockwise direction and to move thereby the free rear end of the arm 23 away from the bottom face of the lower arm of the drive member 24 so that the drive member 24 will engage the rear end of the arm 23 only during a selected part of the oscillating stroke of the drive member, or, when the rod 29 is turned to its extreme position in clockwise direction, the arm 23 is spaced at the rear end thereof from the drive member 24 in such a manner that during oscillation of the latter no engagement between drive member 24 and arm 23 will result, so that no movement in feeding direction will be imparted by the lever means 16 to the saw blade.

The adjustment means 27 permits thereby to adjust the feed movement imparted to the saw blade by the feeding means 16, 24 between zero and a maximum and such an adjustment can be easily carried out with the construction of the present invention while the saw blade 15 is reciprocated in longitudinal direction. In order to arrest the adjustment means 23 in any adjusted position, cooperating means are provided on the arm 28 and on the housing 1 permitting to hold the arm 28 and thereby the rod 29 in a selected adjusted position. The cooperating means may, for instance, include a button 32 fixed to the arm 28 at the side thereof facing a side wall of the housing 1 and this side wall is provided with a plurality of depressions 33 spaced from each other along a circle having its center at the turning axis of the rod 29 so that the button 32 on the arm 28 may be engaged in any of the cavities 33 to thereby hold the adjustment means 27 in a selected adjusted position. The arm 28 is preferably made from flexible material so that the button 32 may be easily snapped in and out of the cavities. Appropriate marks, not shown in the drawing, may be provided at each of the cavities 33 from which the appropriate adjustment of the adjusting means according to the material to be worked on may be ascertained.

The roller 18 is preferably provided with a peripheral groove 19 in which the rear edge of the saw blade 15 is engaged, and the arrangement preferably includes also resilient means, which may be in the form of a tension spring 34 connected at opposite ends thereof to the housing 1 and to the member 14 of the saw blade holder 11, to press the rear edge of the saw blade 15 against the bottom of the peripheral groove 19 in the roller 18, so that during upward movement of the saw blade 15 the latter is moved by the tension spring 34 opposite to its feeding direction, that is away from the workpiece, whereby friction between workpiece and saw blade is reduced and a better ejection of the sawdust obtained.

It will be understood that each of the elements described above, or two or more together, may also find a useful application in other types of sawing apparatus differing from the types described above.

While the invention has been illustrated and described as embodied in a sawing apparatus in which the drive means imparts to the saw blade not only an oscillating movement in longitudinal direction, but also a movement in feeding direction, and in which the movement in the feeding direction may be adjusted during operation of the sawing apparatus between zero and a maximum, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sawing apparatus comprising, in combination, support means; an elongated saw blade mounted on said support means for reciprocating movement in longitudinal direction; drive means operatively connected to said saw blade for reciprocating the latter in said direction; feeding means including a drive member operatively connected at one end thereof to said drive means to be reciprocated with a stroke of a given amplitude, and lever means engaging with one end said saw blade and connected to said support means for tilting about a pivot axis in such a manner that the other end of said drive member is adapted to engage during each stroke said lever means at a portion thereof spaced from said pivot axis for imparting to said saw blade during reciprocation thereof in longitudinal direction a movement having a component in feeding direction of said blade in which the teeth thereof are pressed against a workpiece; and operator-controlled adjustment means cooperating with said feeding means for regulating the movement of said blade in said feeding direction imparted thereto by said feeding means between zero and a predetermined maximum by limiting the engagement between said lever means and said other end of said drive member to a selected part of the stroke of the latter, said adjustment means including an abutment member mounted on said support means adjustable between a plurality of positions and engaging said lever means for moving said portion thereof away from said other end of said drive member for a distance depending on the adjusted position of said abutment member, and an operating member cooperating with said abutment member for adjusting the position of the latter.

2. A sawing apparatus as set forth in claim 1, wherein said drive means includes a motor having a drive shaft and eccentric means fixed to said drive shaft for rotation therewith, said eccentric means being operatively connected to said saw blade and to said one end of the drive member of said feeding means.

3. A sawing apparatus as defined in claim 1, wherein said lever means comprises a lever member connected to said support means tiltably about said pivot axis, and an engaging member carried by said lever member and engaging said saw blade, said drive member being adapted to engage said lever member at a portion thereof spaced from said pivot axis.

4. A sawing apparatus as defined in claim 1, wherein said engaging member is constituted by a roller turnably carried by said lever member.

5. A sawing apparatus as defined in claim 4, wherein said lever member is pivotally connected intermediate its ends to said support means and wherein said roller is turnably carried at one end of said lever member and said drive member is adapted to engage said lever member in the region of the other end of the latter.

6. A sawing apparatus as set forth in claim 5, wherein said lever member is in the form of an angle lever having one arm substantially parallel to the longitudinal direction of the saw blade and carrying on the free end thereof said roller, the other arm of said lever member extending substantially normal to said one arm, said drive member being adapted to engage said other arm in the region of the free end thereof.

7. A sawing apparatus as set forth in claim 6, wherein said roller is formed with a peripheral groove and wherein the rear edge of said saw blade is engaged in said groove.

8. A sawing apparatus as set forth in claim 6, wherein said abutment member includes a rod member extending transverse to said other arm of said lever member and being mounted on said support means for pivotal movement about its axis, said rod member having at a portion thereof a flat bottom face adapted to engage with an edge thereof a top face of said other arm so as to move during pivotal adjustment of said rod member the free end of said other arm away from said other end of said drive member; and said operating means comprises an arm member fixed to the rod member for turning the latter about said axis between a plurality of adjusted positions.

9. A sawing apparatus as defined in claim 3, wherein said abutment member comprises a rod member extending transverse to said lever member and being mounted on said support means for pivotal movement about its axis, said rod member having an eccentric portion adapted to engage a face of said lever member so as to move during pivotal adjustment of said rod member said portion of said lever member away from said other end of said drive member.

10. A sawing apparatus as set forth in claim 8, and including cooperating means on said arm member and said support means for holding said arm member and thereby said rod member in a selected adjusted position.

11. A sawing apparatus as set forth in claim 2, wherein said drive member is in the form of an angle lever engaging at said one end thereof said eccentric means and being pivotally connected intermediate the ends thereof to said support means.

12. A sawing apparatus as set forth in claim 11, wherein said eccentric means includes a pin extending parallel to said drive shaft fixedly connected to the latter for rotation therewith and wherein said angle lever forming said drive member is formed in the region of said one end thereof with and elongated slot through which said pin of said eccentric means extends.

13. A sawing apparatus as set forth in claim 6, and including elastic means cooperating with said saw blade and said roller for pressing the rear edge of said saw blade against said roller.

14. A sawing apparatus as set forth in claim 2, and including connecting means between said eccentric means and said saw blade, said connectnig means being operatively connected at one end thereof to said eccentric means and said saw blade being pivotally connected at one end thereof to the other end of said connecting means, said elastic means being in form of a tension spring connected at one end thereof to said support means and at the other end thereof to said saw blade in the region of said one end of the latter.

15. A sawing apparatus as set forth in claim 2, wherein said eccentric means includes a pin fixed to and extending parallel to said drive shaft, wherein said drive member is in form of an angle lever pivotally connected intermediate its ends to said support means and having at said one end thereof an elongated slot through which that pin slidingly extends, and including connecting means between said eccentric means and said saw blade, said connecting means being operatively connected at one end thereof to said eccentric means and said saw blade being pivotally connected at one end thereof to the other end of said connecting means, and tension spring means connected at one end thereof to said support means and at the other end thereof to said saw blade in the region of said one end of the latter for pressing the rear edge of said saw blade against said roller.

References Cited

UNITED STATES PATENTS

| | | | |
|---|---|---|---|
| 2,775,272 | 12/1956 | Papworth | 143—68 |
| 2,917,088 | 12/1959 | Papworth | 143—68 |
| 2,931,402 | 4/1960 | Papworth | 143—68 |

DONALD R. SCHRAN, *Primary Examiner.*